US008024697B2

(12) United States Patent
Hamilton et al.

(10) Patent No.: US 8,024,697 B2
(45) Date of Patent: Sep. 20, 2011

(54) VARIOUS METHODS AND APPARATUSES FOR ESTIMATING CHARACTERISTICS OF AN ELECTRONIC SYSTEMS DESIGN

(75) Inventors: Stephen Hamilton, Pembroke Pines, FL (US); Ian Andrew Swarbrick, Sunnyvale, CA (US); Scott Carlton Evans, Santa Clara, CA (US); Wolf-Dietrich Weber, San Jose, CA (US); Jay S. Tomlinson, San Jose, CA (US)

(73) Assignee: Sonics, Inc., Milpitas, CA (US)

( * ) Notice: Subject to any disclaimer, the term of this patent is extended or adjusted under 35 U.S.C. 154(b) by 0 days.

(21) Appl. No.: 12/729,509

(22) Filed: Mar. 23, 2010

(65) Prior Publication Data
US 2010/0318946 A1    Dec. 16, 2010

Related U.S. Application Data

(60) Division of application No. 11/398,036, filed on Apr. 4, 2006, now Pat. No. 7,694,249, which is a continuation-in-part of application No. 11/246,809, filed on Oct. 7, 2005, now abandoned.

(51) Int. Cl.
| | |
|---|---|
| G06F 17/50 | (2006.01) |
| G06F 9/455 | (2006.01) |
| G06F 11/22 | (2006.01) |

(52) U.S. Cl. ........ 716/136; 716/128; 716/132; 716/133; 716/134; 716/135

(58) Field of Classification Search .............. 716/4, 128, 716/132–136
See application file for complete search history.

(56) References Cited

U.S. PATENT DOCUMENTS

| | | | |
|---|---|---|---|
| 5,948,089 A | 9/1999 | Wingard et al. | |
| 6,182,183 B1 | 1/2001 | Wingard et al. | |
| 6,683,474 B2 | 1/2004 | Ebert et al. | |
| 6,725,313 B1 * | 4/2004 | Wingard et al. | 710/305 |
| 6,785,753 B2 | 8/2004 | Weber et al. | |
| 6,816,814 B2 | 11/2004 | Ebert et al. | |
| 6,880,133 B2 | 4/2005 | Meyer et al. | |
| 6,882,966 B2 | 4/2005 | Ryu et al. | |
| 7,050,958 B1 | 5/2006 | Bortfeld et al. | |
| 7,139,955 B2 | 11/2006 | Rohrbaugh et al. | |
| 7,194,566 B2 | 3/2007 | Wingard et al. | |
| 7,194,658 B2 | 3/2007 | Staton et al. | |
| 7,257,802 B2 | 8/2007 | Daw et al. | |

(Continued)

OTHER PUBLICATIONS

Srinivasan et al.; "Accurate area and delay estimation from RTL descriptions"; Mar. 1998; IEEE Transactions on VLSI Systems; pp. 168-172.*

(Continued)

*Primary Examiner* — Suresh Memula
(74) *Attorney, Agent, or Firm* — Thomas S. Ferrill; Rutan & Tucker, LLP

(57) ABSTRACT

Methods and apparatuses are described for an Intellectual Property (IP) Generator for estimating timing, area, and power characteristics of an electronic system design. The IP Generator receives a user-supplied file having data describing a configuration of an IP design having multiple levels of hierarchy. The IP Generator also receives user-supplied technology parameters and data-flow information. The IP generator correlates estimated timing, area, and power characteristics for each IP sub component based on the user supplied technology parameters, data-flow information and configuration parameters. The IP generator reports the timing, area, and power estimates to a user via a graphic user interface prior to a transformation of a Register Transfer Level (RTL) design into the gate-level circuit design.

18 Claims, 9 Drawing Sheets

U.S. PATENT DOCUMENTS

| | | |
|---|---|---|
| 7,266,786 B2 | 9/2007 | Chou et al. |
| 7,284,177 B2 | 10/2007 | Hollander et al. |
| 7,325,221 B1 | 1/2008 | Wingard et al. |
| 2006/0225015 A1 | 10/2006 | Synek et al. |
| 2007/0028196 A1* | 2/2007 | Martin et al. ............... 716/3 |
| 2007/0083830 A1 | 4/2007 | Hamilton et al. |

OTHER PUBLICATIONS

Xu et al.; "Layout Driven RTL Binding Techniques for High Level Synthesis Using Accurate Estimators"; Oct. 1997; ACM Transactions on Design Automation of Electronic Systems, vol. 2, No. 4; pp. 312-343.*

Nemani et al.; "High level area and power estimation for VLSI circuits"; Jun. 1999; IEEE Transactions on CAD of ICs and Systems; pp. 697-713.*

U.S. Appl. No. 11/203,554, filed Aug. 11, 2005, Chou, et al.

Richard Ruigrok, "Hardware-Software Co-Simulation with System C", Qualcomm Incorporated, Jun. 7, 2004, pp. 17.

Sofiene Tahar, "Assertion and Model Checking of SystemC", hardware Verification Group, Department of Electrical and Computer Engineering, Concordia University Montreal, Quebec, Canada, First Annual North American SystemC Users Group (NASCUG) Meeting, Jun. 7, 2004, pp. 28.

Alan Kamas, "Dot.Org—Open Core Protocol: The SystemC Models" article, published in Apr./May 2004 issue of Chip Design Magazine, http://www.chipdesignmag.com/print/php?articleld=28?issueld=4, pp. 2.

Alan Kamas, "The SystemC OCP Models, an Overview of the SystemC Models for the Open Core Protocol", NASCUG Sep. 29, 2004, Copyright alan Kamas 2004, www.kamas.com, pp. 30.

2nd NASCUG Meeting Agenda, Meeting Presentations, GSPx 2004, Santa Clara, CA U.S.A., Sep. 29, 2004, http://www.nascug.org/nascug2004_fall.agenda.html, North American SystemC Users Group, pp. 2.

Hardware Verification Group, "SystemC Verification Problematic", System-on-Chip Verification <http://hvg.ece.concordia.ca/Research/SoC/>, 2004, pp. 26.

Chou, Joe, et al, "System-Level Design Using OCP Based Transaction-Level Models" Denali MemCon Taiwan, Mar. 15, 2005, 23 pages.

Calypto Design Systems, Inc., "Navigting The RTL to System Continuum", www.calypto.com, 2005, pp. 1-6.

Haverinen, Anssi, et al, SystemC™ based SoC Communication Modeling for the OCP™ Protocol, V1.0, Oct. 14, 2002, 39 pages.

Non-Final Office Action for U.S. Appl. No. 11/246,809 mailed Mar. 17, 2008, 7 pages.

Non-Final Office Action for U.S. Appl. No. No. 11/398,036, mailed Mar. 20, 2009, 19 pages.

Alexanian, H., Bolden, G., Amir, Z., "Simplifying the Behavior of System C Descriptions for Hardware/Software Covalidation," copyright 2005 [retrieved Apr. 26, 2008] Retrieved from the Internet. <URL: www.ocpip.org/pressroom/schedule/speaking/papers_presentations/Summit_OCP-IP_pavillion_pres.pps>.

* cited by examiner

VARIOUS METHODS AND APPARATUSES FOR ESTIMATING CHARACTERISTICS OF AN ELECTRONIC SYSTEMS DESIGN

RELATED APPLICATION

This is a Divisional Application which claims benefit to U.S. patent application Ser. No. 11/398,036, (U.S. Pat. No. 7,694,249), entitled "VARIOUS METHODS AND APPARATUSES FOR ESTIMATING CHARACTERISTICS OF AN ELECTRONIC SYSTEM'S DESIGN", filed Apr. 4, 2006, which was a continuation in part application of U.S. patent application Ser. No. 11/246,809, entitled "METHOD AND APPARATUS FOR AN EXECUTABLE PARAMETERIZED TIMING MODEL" filed on Oct. 7, 2005, now abandoned and the current application claims benefit of both.

FIELD OF THE INVENTION

Aspects of embodiments described herein apply to the development process of electronic systems, especially System on a Chip (SOC).

BACKGROUND

In computer networks, internetworking, communications, integrated circuits, etc., where there is a need to communicate information, there may be interconnections established to facilitate the transfer of the information. Interconnects may provide the physical communication network between two agents such as agents of Intellectual Property (IP) blocks. When designing systems that comprise such IP blocks and interconnects, the physical layout of IP blocks and its corresponding interconnects typically occur after the design/architecture and simulation stages are complete. Such an approach can potentially require revisions to the original design and simulation stages if it is not physically possible to place the components in such a way as to properly represent the original design. For example, a System on a Chip design may require the placement of components in such a way that is not physically possible to connect the various IP blocks in the manner when the architectural design was generated for this System on a Chip. Thus, one design hierarchy description may be used during the front-end design process and then possibly manually re-organized into a different design hierarchy description for use in the back-end design process. Under the traditional approach, such a problem may not be noticed until after the design and simulation stages have completed. The design would then have to be revised as well as further simulation testing. This approach could drastically increase the overall timeline of a development project. Another approach may be needed, where the physical layout of components may be incorporated into the architectural design stage. Such an approach may catch potential design problems earlier on, such that revisions to the original design, additional simulation and regeneration of Netlists are avoided.

SUMMARY OF THE INVENTION

Methods and apparatuses are described for an Intellectual Property (IP) Generator for estimating timing, area, and power characteristics of an electronic system design. The IP Generator receives a user-supplied file having data describing a configuration of an IP design having multiple levels of hierarchy. The data includes one or more configuration parameters. The IP Generator also receives user-supplied technology parameters and data-flow information. The IP generator creates an abstract executable representation for each IP sub component making up the IP core design. Abstract executable representations of Timing, Area, and Power (TAP) characteristics for each IP sub component in the IP design execute to allow the corresponding TAP modules in the IP generator to estimate timing, area, and power quantities of a predicted gate-level circuit design. The IP generator correlates estimated amount and types of circuit level components that make up each IP sub component based on the user supplied one or more configuration parameters. The IP generator may translate those estimates to quantities by applying the technology parameters or data flow activity parameters. The IP generator reports the predicted timing, area, or power results to the user via a graphic user interface. The IP generator provides the predicted timing, area, or power results to the user prior to logic synthesis of a Register Transfer Level (RTL) design of the IP block.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, numerous specific details are set forth, such as examples of specific protocol commands, named components, connections, types of modules, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

In a highly configurable System on a Chip (SOC) interconnect, many configuration options enable a user to make tradeoffs between Timing (latency and frequency), Area (logic gate/transistor and wire routing), and Power (dynamic and static) characteristics. It is therefore valuable to have a mechanism for enabling the user to estimate the impact of their configuration decisions on the TAP characteristics of the finished SOC interconnect. Some traditional methods for TAP estimation require detailed physical implementation work, including logic synthesis, place and route, extraction and back-annotation, and application scenario-dependent power analysis. Such traditional methods prevent accurate TAP modeling during the architectural exploration stage since TAP estimates are not available until substantial physical implementation of the design has been established. This requires much time and cost, especially when numerous physical renditions may be required to accomplish acceptable TAP values for a given SOC interconnect.

Figure 1:
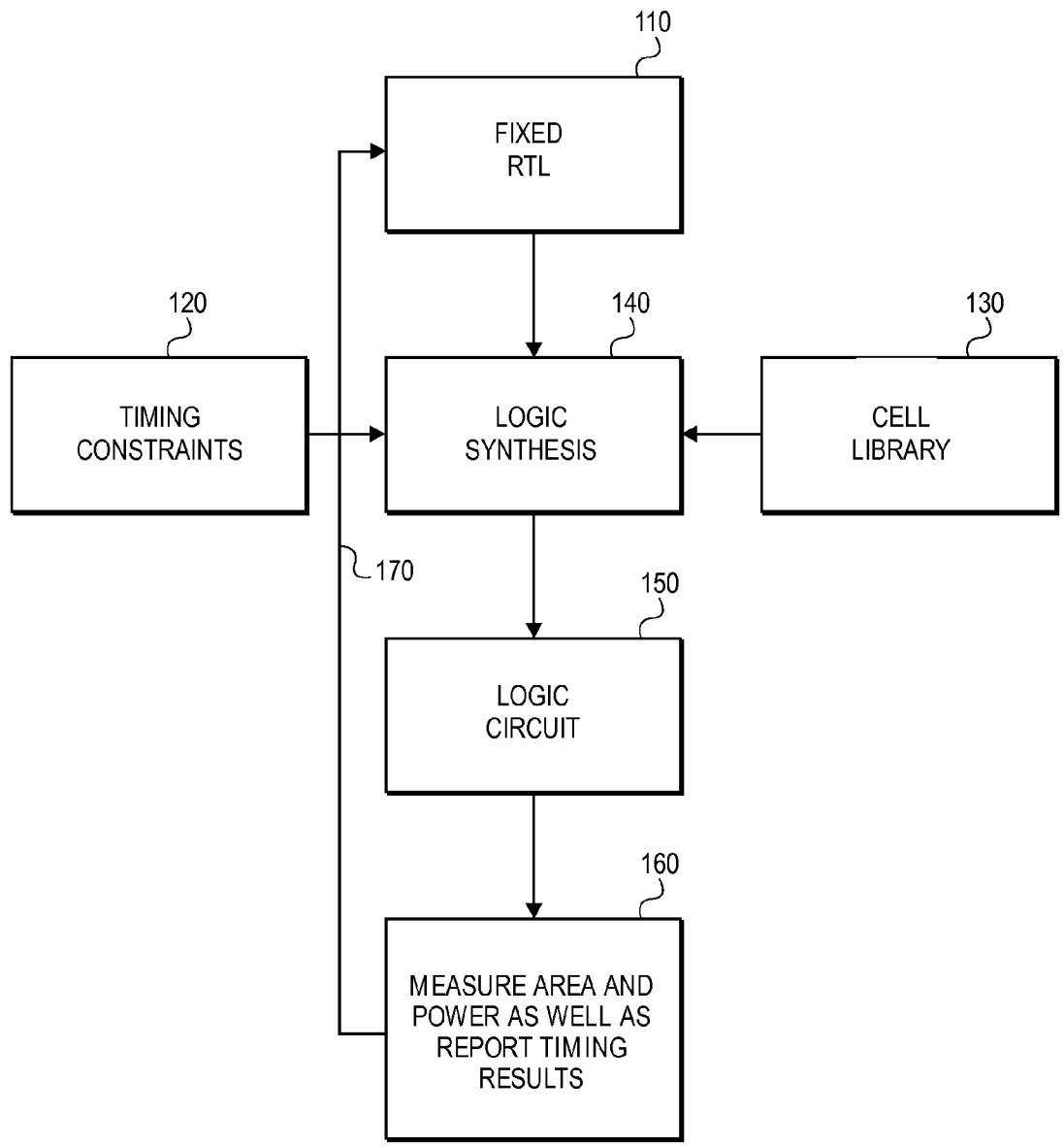
FIG. 1 illustrates an embodiment of a method of a design flow for a system on a chip design.

FIG. 1 illustrates an embodiment of a first way of design flow for an SOC design. A configured IP block design, in the form of a fixed RTL design file, 110 is created. An IP generator may generate the RTL description in a pre-logic synthesis portion of the overall design process described later. Generally, a RTL description describes what intermediate information (i.e. information stored between clock cycles in an electronic circuit) is stored in registers, where it is stored within the design, and how that information moves through the design as it operates. The RTL description of an electronic system is a functional description at least one level of abstraction higher than the layout of the electronic design system (e.g., gate-level implementation/Netlist). The logic synthesis tool 140 receives the fixed RTL design 110, as well as user-defined timing constraints 120 and characteristics of logic gates from a cell library 130. Thus, the RTL code may be combined with component information from a logic cell library and then run through the logic synthesis tool. The logic synthesis tool 140 synthesizes and outputs logic circuit 150 as a completed gate-level design circuit. Generally, a logic synthesis tool transforms an IP block, such as a SOC interconnect, description from one level of abstraction to a lower level, usually towards some physical implementation. The logic synthesis tool translates the RTL design to software representations of logic gates and each logic gate inherits its physical characteristics described in the cell library. Traditionally, once a SOC interconnect design has been synthesized to a gate-level design, analysis may be done for TAP characteristics. Once the circuit is generated, the synthesis tool generates a timing report 160. This lists the worst timing paths in the design, including those that failed a user-supplied timing goal. Thus, the timing, area, and power consumption measurements are taken 160 based on this representation of the final logic circuit 150. If the timing, area, and power measurements are not satisfactory, the process starts over 170 by altering the fixed RTL design 110 and moving through each step in FIG. 1 until acceptable TAP measurements are met by the user.

It would be beneficial to also have a method where such TAP estimates may be accomplished before a SOC interconnect is reduced to a gate-level design through logic synthesis. Such a method may drastically reduce the time and cost spent on such a design. Accordingly, various methods and apparatus discussed herein allow modeling accurate TAP characteristics during the architectural exploration phase of the design process for an integrated electronic system such as a System on a Chip. The IP generator may capture relevant TAP parameters as part of the original interconnect (pre-configuration) design. As the user considers the interconnect configuration, an analysis tool combines the TAP parameters with the configuration information, plus generalized physical distances and various application scenarios, to provide useful overall TAP estimates before any detailed implementation of a final logic circuit is performed.

In an embodiment, an individual IP block may be a component in an electronic system design element that performs a particular function such as information processing, storage, or communications function, or a collection of such functions. Examples of an IP block might be a Central Processing Unit (CPU), a dynamic memory controller, an Ethernet interface block, interconnect, etc. representing the electronic system functions of processing, storage, and communications functions, respectively. Note that to perform its system function, each of the above examples internally includes processing, storage, and communications logic. For instance, a CPU might contain internal arithmetic logic to perform information processing, register files and caches to provide local operand and instruction storage, and a bus interface unit to perform communication with the rest of the system. Generally, each IP block contains the circuitry it needs to perform this functionality for the system.

Thus, an IP block is generally implemented with a hierarchical internal structure, wherein the IP block comprises a set of interconnected IP sub-components. The IP sub-components typically perform dedicated processing, storage, or communications functions for the IP block. It is normal that all, or at least most, of these sub-components internally have a hierarchical structure and contain a mixture of processing, storage, and communications logic. For example, the main datapath of a CPU, while responsible for the primary data processing, typically contains data storage registers between pipeline stages to enable processing frequencies higher than could be supported based upon waiting for the full datapath logic to operate fully on its operands. Additionally, most IP sub-components contain one or more control-oriented state machines to perform tasks such as sequencing the processing and/or communication tasks of the sub-component or determining various operating modes of the sub-component.

An IP sub-component is typically described in a behavioral description with a traditional programming language (e.g. SystemC) or a hardware description language (e.g. Verilog or VHDL) at a level of abstraction that is above the underlying component level transistors and logic gates that will implement the sub-component in the final electronic system. In particular, the multiple internal tasks of a sub-component, and the mixing of different types of logic, would typically cause an IP sub component to be described as an abstract executable representation that may include a hierarchical set of subroutines or classes in a programming language, or modules (Verilog) or entities (VHDL) in a hardware description language. In an embodiment, the abstract executable representation is at least one layer of abstraction higher than a predicted Register Transfer Level design making up an IP sub component block of the IP design. In an embodiment, the abstract executable representation is at least one layer of abstraction higher than a predicted gate level design making up an IP sub component block of the IP design.

Figure 2:
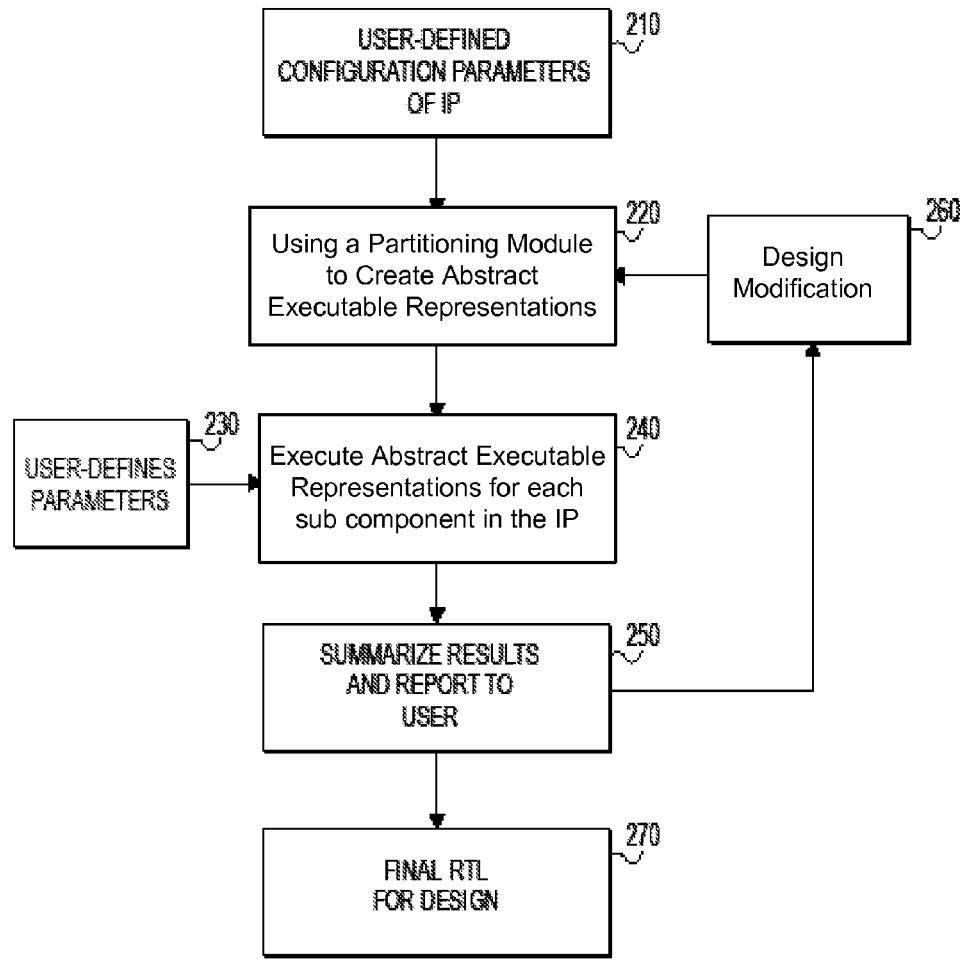
FIG. 2 illustrates an embodiment for an improved design flow for an SOC design.

FIG. 2 illustrates a flow diagram of the design process steps using an embodiment of the IP generator with Timing, Area, and Power (TAP) modules to report the predicted timing, area, or power results to the user via a graphic user interface prior to a transformation of a Register Transfer Level (RTL) design into the gate-level circuit design. A method is described for capturing relevant TAP characteristics as part of the original interconnect generator design. A TAP module executes an abstract executable representation for a particular TAP characteristic to generate parameters that estimate an amount and type of circuit level components that make up each IP sub component. These TAP characteristic parameters may be measured in abstract units based on the user supplied configuration parameters. These TAP characteristic parameters may then be converted to recognizable measurements by applying user-supplied technology modeling parameters. As a user considers an IP block such as an interconnect configuration, an estimator tool combines the user-defined configuration information and the user-supplied technology model parameters, and produces TAP estimates for each sub component. In one embodiment, the estimator tool could be a sub-level tool of a larger SOC compilation tool (SOCCOMP). The SOCCOMP is an example implementation of an IP Generation tool. Further, the estimator tool combines additional information about generalized physical distances and various application scenarios to provide useful overall TAP information before any detailed physical implementation is performed (e.g. logic synthesis and placement and routing).

In an embodiment, the IP generation tool may be a collection of executables, scripts, and behavioral models. The collection supports design capture, and automation of a design flow that is based upon standard industry ASIC design tools. Human readable text files can be used to store the design database, and to transport information from one tool to another. The IP generation tool defines a generic step in the design flow, and provides standard interfaces (file, user, and API) to support that step.

In the first step, the user supplies a file that describes the configuration of an IP design(s) using a set of pre-defined parameters 210. Thus, the user creates a text design file with configuration parameters of the IP design. In the second step, the analysis tool uses a partitioning module to generate each IP sub component of an electronic system design as an abstract executable representation 220.

Next, the analysis tool receives user-specified technology parameters and data-flow information for timing, area, and power consumption estimates 230. In an embodiment, data flow information is only used for power consumption predictions. The user provides information that describes the important parameters of the silicon process technology, and the logic cell library to be used for implementation. In an embodiment, the technology parameters may be entered by both the user as well as extracted by the IP generator from a synthesis database type file.

Next, for each sub component in the IP design, separate TAP models/abstract executable representations are executed 240. The analysis tool executes separate TAP abstract executable representations and reports the results to the user. In one embodiment, the separate timing, area, and power modules are sub-modules of the larger analysis tool. Each abstract executable representation takes in the user-supplied technology parameters from step 230 and the configuration parameters derived from the text design file 210. Thus, for each sub component in the IP design, a parameterized model is executed which produces data on the timing, area, and power of the unit.

As discussed, the TAP models themselves may be built into the IP generator software that generates the IP sub components as abstract executable representations. These models are used very early in the design flow to make trade-offs in the design parameters. These models are highly configurable. Execution of the abstract executable representations produces accurate predictions of the timing, area, and power consumption of the logic circuit represented in the gate level Netlist.

Next, the results of the executable TAP models are reported to the user 250. If the results are acceptable to the user, the design is finalized and is ready to be passed into the next design flow stage (e.g., RTL generation).

If the performance results are not acceptable, or the user wants to continue making trade-offs, the design is modified 260 (by modifying the text design file with configuration parameters) and steps 210-250 are repeated. Thus, the text design file may be continuously modified and steps 210-250 reprocessed until an acceptable TAP model is constructed.

The user is able to make changes to the parameters of the IP design and quickly assess the impact on the logic circuit that will be later generated by a logic synthesis tool. The user can try a large set of parameters and assess the resulting performance in a relatively short space of time.

Once the TAP model "reports" are accepted by the user, the Register Transfer Level (RTL) description may be produced for the design, and the logic synthesis tool translates the RTL into a gate-level circuit design 270. Once a gate-level circuit design exists, actual TAP measurements may be reported. Thus, the actual TAP characteristics for the final gate-level circuit design, which result after step 270 should be substantially similar to the TAP estimates compiled in step 250.

The advantages of the design flow illustrated in FIG. 2 over FIG. 1 should be obvious. The information of timing, area, and power is available much earlier in the design flow from FIG. 2, than with FIG. 1. The TAP information may be generated much faster, since the TAP models are more abstract than those generated using logic synthesis. These TAP models also may be used much earlier in the design flow to make trade-offs in the design parameters. Thus, a user may rapidly assess a large number of physical performance trade-offs when configuring semiconductor IP designs because 1) the amount of time to run the calculations on an IP sub component level rather than through each individual component making up that IP sub component is much faster and 2) the results of TAP modeling are presented to the user at an earlier stage in the design flow process. This differs from the approach in FIG. 1, where TAP measurements of the design cannot be made until later in the design flow (e.g., after logic synthesis has been performed). These TAP estimate reports are available to the user prior to generation of the fixed RTL in step 270, where the TAP measurements for the gate-level design are not available until after the generation of the fixed RTL in step 110. Thus, the approach in FIG. 2 has a shorter modify/test loop than the approach in FIG. 1 by allowing a larger number of design parameters to be considered and optimized in a shorter period of time.

Figure 2B:
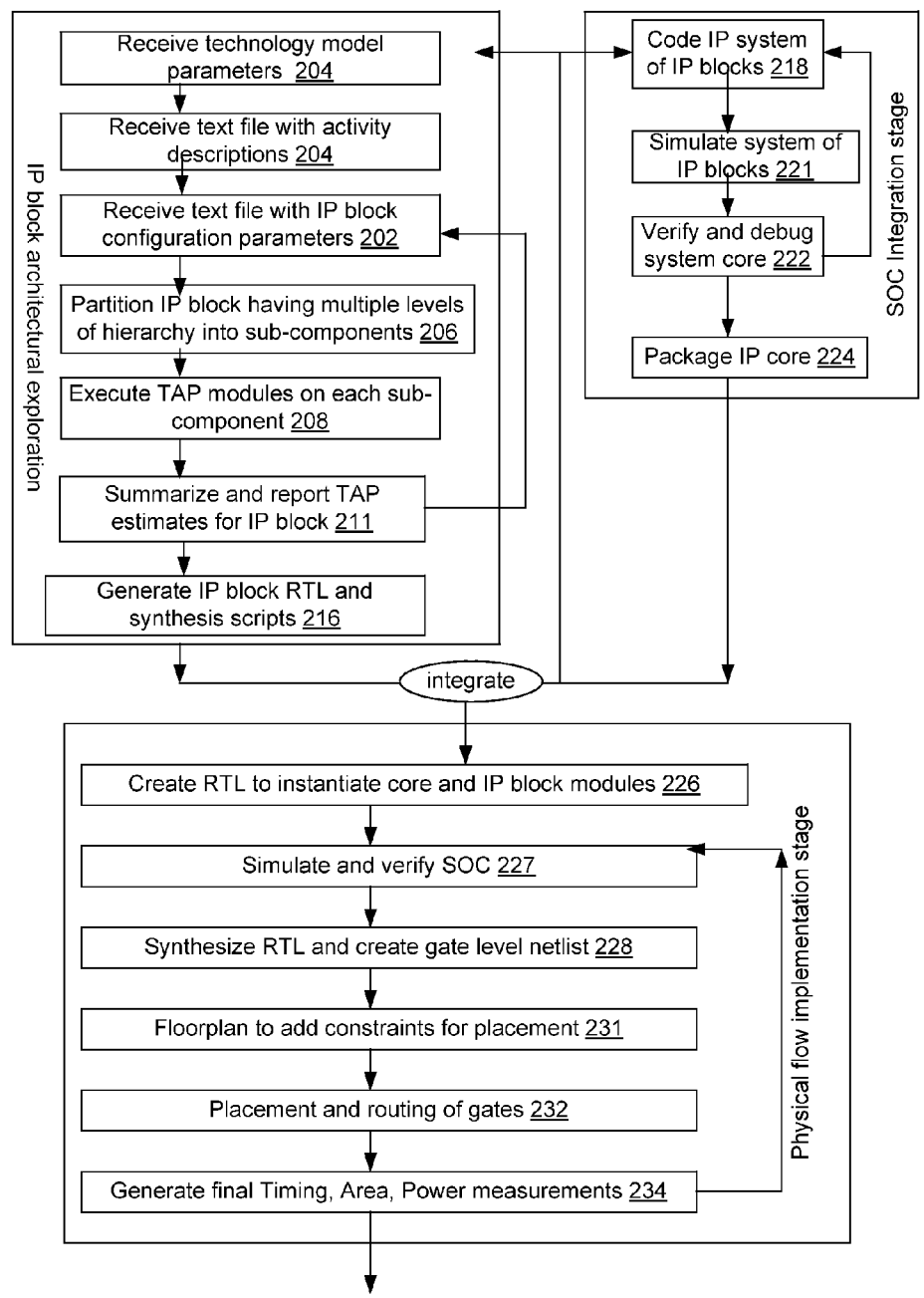
FIG. 2b illustrates a flow diagram of the design process steps using an embodiment of the IP generator with TAP modules to report the predicted timing, area, or power results to the user via a graphic user interface prior to a transformation of a RTL design into the gate-level circuit design.

FIG. 2b illustrates a flow diagram of the design process steps using an embodiment of the IP generator with Timing, Area, and Power (TAP) modules to report the predicted timing, area, or power results to the user via a graphic user interface prior to a transformation of a Register Transfer Level (RTL) design into the gate-level circuit design. Hardware logic, coded software, and a combination of both may be used to implement the following design process steps using an embodiment of the IP generator. The IP generator may be a single tool or a compilation of two or more discrete tools.

In block 202, the IP generator receives a user-supplied text file having data describing a configuration of an individual IP block having multiple levels of hierarchy. The data may include one or more configuration parameters for that IP block. The IP block description may be an overall functionality of that IP block such as an interconnect. The configuration parameters for the interconnect IP block may be number of address regions in the system, system addresses, how data will be routed based on system addresses, etc.

In block 204, the IP generator receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

In an embodiment, the IP generator receives the user-supplied parametric summary of the characteristics of the cell based implementation technology, where the parameters are used to quantify the timing, area, and power estimates for each of the IP sub components for a specific implementation technology.

In block 206, the IP generator partitions the IP block design by creating an abstract executable representation for each IP sub component making up the IP block design. The abstract executable representation models TAP characteristics for each IP sub component and mimics characteristics similar to those of the actual IP block design. In an embodiment, each abstract executable representation of TAP characteristics must be explicitly coded to translate parameters of the first IP sub component into a TAP quantity and modeled exclusively in that TAP domain. For example, abstract executable representations of area characteristics must be explicitly coded to model area characteristics of that IP sub component solely in the area domain. The model does not focus on other behavioral characteristics of that IP block. Further, an algorithm, equation, or other routine is used to translate the parameters of an IP sub component at its specific level of decomposition from the supplied IP design into a TAP quantity value.

In block 208, the IP generator executes TAP modules on each sub-component. The configuration parameters are used to configure each corresponding timing, area, or power abstract executable representation for each IP sub component. Execution of the abstract executable representations can generate parameters that estimate an amount and type of circuit level components that make up each IP sub component. The user-supplied technology parameters are applied to translate the estimated amount and type of circuit level components that make up each IP sub component and their corresponding attributes to TAP quantities. In an embodiment for power consumption, activity scenarios are applied to determine power consumption quantities. Thus, the IP generator correlates the estimated amount and types of components that make up each IP sub component to predict timing and/or area characteristics for that IP sub component. The IP generator also correlates the activity scenarios for the estimated amount and types of components that make up each IP sub component to predict power consumption characteristics for that IP sub component. As discussed, the correlation may be made based on a value or a description supplied by a user in response to, for example, a user interface questionnaire where each technology has a limited number of possible options. thus, the value/description can be correlated to a predicted amount and type of components that make up each IP sub component. An algorithm may calculate the predicted timing, area, or power characteristics for that IP sub component based on the estimated amount and types of circuit level components derived from the configuration parameters and the technology parameters.

For example, a six input circuit of a first implementation technology, such as standard cell technology, correlates to X number of logic gates of a specific type to form a six input circuit in that first implementation technology. The X number of logic gates on average correlates to Y amount of area consumed on a chip. Implementation of the six input circuit with X number of logic gates in this technology on average also correlates to Z number of critical path stages in this input-output circuit for timing issues. In an embodiment, some of the parameter information and correlating information for a specific technology may be derived from a library, a database, or directly coded into algorithms specific to that technology.

Each IP sub component may be composed of a heterogeneous mixture of processing logic, storage logic, or communications logic that is represented by an abstract executable representation at least one layer of abstraction higher than the predicted gate-level circuit design (i.e. individual transistors and logic gates) making up the first IP sub component block.

An example of a power module predicting power characteristics may be as follows. The IP generator estimates the IP sub components internal activity from a user supplied activity description, such as external stimulus description. The power module of the IP generator applies those activity estimates to the power module for each IP sub component together with any other user supplied technology parameters. The power module executes the abstract executable representations of power characteristics to predict the power consumption for that IP sub component. The power module then aggregates all of the IP sub component consumption estimates into an IP consumption estimate for the IP block.

In block 211, the IP generator summarizes and reports at least the predicted timing, area, or power aggregated results to the user via a graphic user interface. The IP generator may also report the timing, area, and power results for each individual IP sub component. The IP generator summarizes and reports the predicted timing, area, and power results to the user prior to transformation of a register transfer level design into the gate-level circuit design (i.e. logic synthesis) and even prior to generating a fixed RTL design file for this IP block.

In block 211, the IP generator also analyzes the application's performance and allows the user to supply a new configuration of the IP block design or a functional description with new technology parameters. As discussed before, since the results are reported back to user in this early stage of ASIC, SOC, etc design, the user may run several different iterations of technology parameters and configuration parameters that can be correlated to different timing, area, and power characteristics in a short amount of time.

The timing and area models should provide the user quick feedback when coarse changes are made to the configuration parameters associated with an IP core design. For example, in the case of the interconnect design coarse changes may include: moving blocks around, adding extra pipeline points, changing the width of a link, etc. Similarly, the power models rely on activity scenarios from user inputs regarding dataflows. Example dataflow information for an interconnect IP block may include values for read/write mix, mean burst length, source and destination information. The power module can track changes in the activity scenarios to provide the user quick feedback when considering different activity scenarios. A side-by-side comparison between the different activity scenarios may also be presented the user.

After the user is satisfied with the performance results of one of the iterations of the supplied configuration of the IP design parameters and the technology parameters run above in blocks 202-211, the user may select the eventual IP core design with its associated technology parameters.

In block 216, the IP generator integrates the results from the abstract executable representations with potentially additional information to generate the synthesis scripts for the IP block. The IP generator may supply the synthesis scripts to establish various TAP goals for the IP block after the result of the overall TAP estimates are presented to the user.

The IP generator may also generate the RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

A separate design path in an ASIC or SOC chip design is called the integration stage. The integration of the system of IP blocks may occur in parallel with the generation of the RTL file of the IP block and synthesis scripts for that IP block.

In block 218, the system designer codes the system of IP blocks to work together.

In block 221, an IP tool simulates the system of IP block's behavior.

In block 222, the system designer verifies and debugs the system of IP blocks' behavior. Thus, the operation of the IP core is verified and debugged.

In block 224, an IP tool packages the IP core.

In block 226, a logic synthesis tool receives synthesis scripts for the IP core and the RTL design file of the IP core. The logic synthesis tool also receives characteristics of logic gates from a cell library. RTL code may be generated to instantiate the SOC containing the system of IP blocks.

In block 227, the system of IP blocks with the fixed RTL and synthesis scripts may be simulated and verified.

In block 228, the logic synthesis tool synthesizes the RTL design to create a gate level Netlist circuit design (i.e. a description of the individual transistors and logic gates making up all of the IP sub component blocks).

In block 231, floorplaning occurs and adds constraints for placement of components within a chip.

In block 232, an IP tool places and routes circuit level components such as logic gates in XY coordinates on the chip.

In block 234, an IP tool generates final timing, area, and power measurements for the IP blocks. Later, masks may be generated from this representation of the IP core. The masks may be used in the fabrication of the physical gate level implementation of this IP core.

Figure 3A:
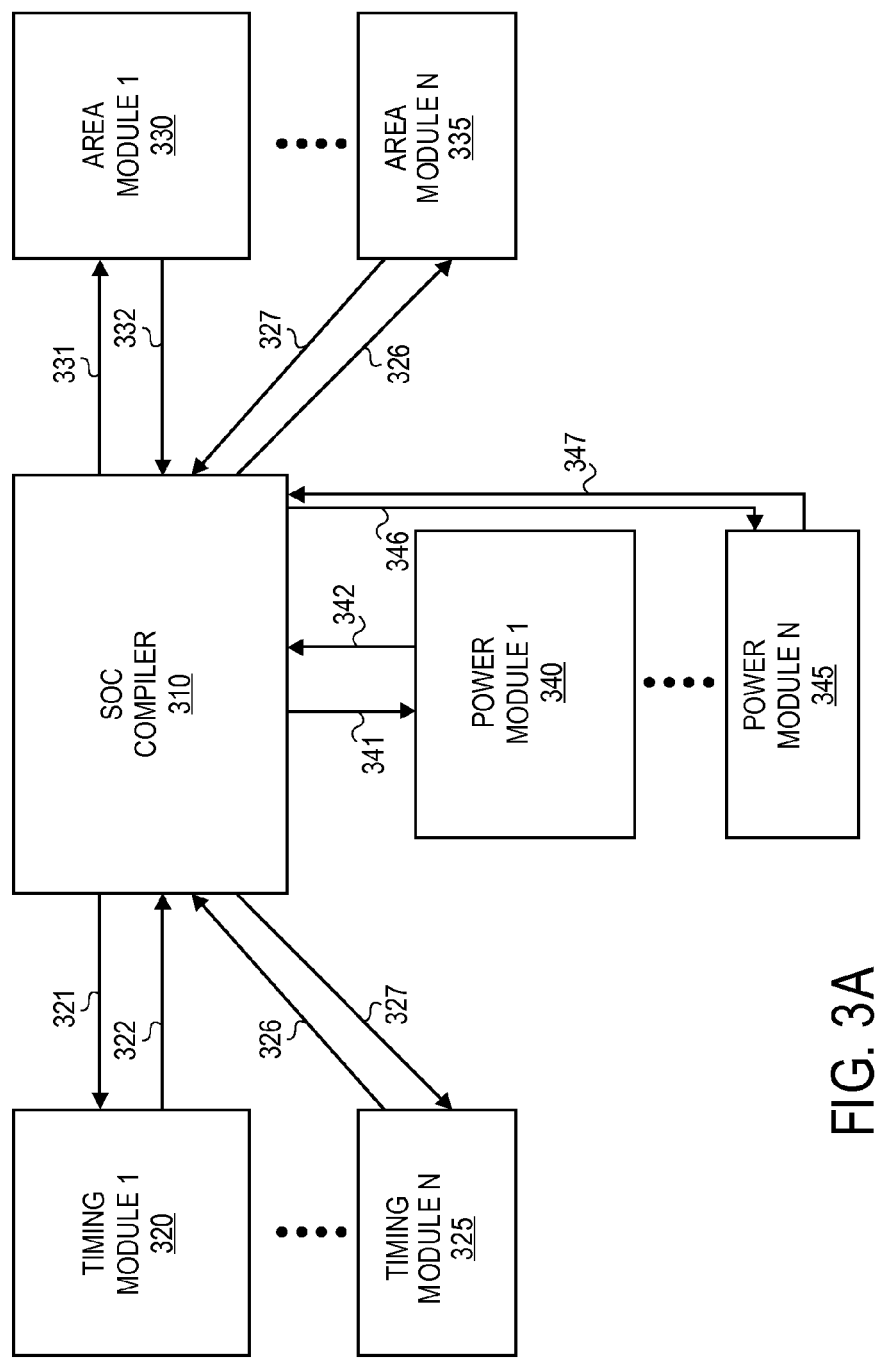
FIG. 3A illustrates an embodiment of a system architecture of an SOC compiler and TAP modules executing abstract executable representations of TAP characteristics for each IP sub component in the IP design.

FIG. 3A illustrates an embodiment of a system architecture of an SOC compiler (i.e. an embodiment of an IP generator) and associated TAP modules executing abstract executable representations of TAP characteristics for each IP sub component in the IP design. In one embodiment, SOC Compiler 310 (SOCCOMP) is a compiler tool coupled to one or more TAP modules. SOCCOMP 310 is responsible for passing data structures to each TAP module, along with user-defined parameters and internally derived parameters. The data structures are empty data structure fields that will eventually be populated by the TAP modules. The user-defined parameters are constraints, defined by the user, that are used to configure the IP. The internally derived parameters are derived from within SOCCOMP 310 and are based on the user-defined parameters. These parameters are used to specifically configure sub components in the RTL generation.

SOCCOMP 310 passes empty data structures, user-defined and internally derived parameters 321 to Timing Module-1 320. Timing Module-1 320 is a first instance of a timing module based on the first sub component within the text design file. For each sub component within the text design file, a new instance of a timing module will be created. So there will be N timing modules 325 for N sub components in the text design file. Based on the received parameters and data structures, Timing Module-1 320 processes the information and populates the data structures. Timing Module-1 320 passes the populated data structures 322 back to SOCCOMP 310. SOCCOMP uses the received data structures to generate the actual timing estimates. Generation of the timing estimates are accomplished by determining the time frame to travel through each input and output of each IP sub component and aggregating the times for each IP sub component. The timing module may estimate a time frame to travel through each sub component in the electronic design system prior to processing the post logic synthesis estimates of the electronics system design in the physical flow implementation stage. The timing estimates may be generated by determining the longest time frame to travel through each IP sub component. In another embodiment, the estimation of travel times is determined independent of using an actual circuit in a cell library. For each N timing module instance, empty data structures and parameters are passed 327 to Timing Module-N 325. In turn, Timing Module-N 325 returns the populated data structures 326 to SOCCOMP 310.

SOCCOMP 310 also passes data structures, user-defined and internally derived parameters 331 to Area Module-1 330. Area Module-1 330 is a first instance of an area module based on the first sub component within the text design file. For each sub component within the text design file a new instance of an area module is created. So there are N area modules 335 for N sub components in the text design file. Based on the received parameters and data structures, Area Module-1 330 processes the information and populates the data structures. Area Module-1 330 passes the populated data structures 332 back to SOCCOMP 310. SOCCOMP uses the received data structures to generate the actual area estimates by aggregating the area estimates of all the IP sub components. In another embodiment, SOCCOMP 310 aggregates area estimates of all the IP sub components in the electronic system design prior to calculating the post logic synthesis estimate of the electronic system design. In another embodiment, the aggregation of the area estimates of all the IP sub components may be done independent of using a design of an actual circuit in a cell library. For each remaining N area module instance, empty data structures and parameters are passed 336 to Timing Module-N 335, with populated data structures returned 337 to SOCCOMP 310. General characteristics of each IP sub component, such as number of logic gates to form the IP sub component and arrangement of these logic gates, may be stored in a data structure or derived from information mined from the logic cells that would make individual units in each IP sub component.

SOCCOMP 310 also passes data structures, user-defined and internally derived parameters 341 to Power Module-1 340. Power Module-1 340 is a first instance of a power module based on the first sub component within the text design file. For each sub component within the text design file a new instance of a power module will be created. So there will be N power modules 345 for N sub components in the text design file. Based on the received parameters and data structures, Power Module-1 340 processes the information and populates the data structures. Power Module-1 340 passes the populated data structures 342 back to SOCCOMP 310. SOCCOMP uses the received data structures to generate the actual power estimates by aggregating the power consumption estimates for all the IP sub components. In another embodiment, SOCCOMP 310 aggregates the power consumption estimates of all the IP sub components in the electronics system design prior to calculating the post logic synthesis estimates of the electronic design. For each N power module instance, empty data structures and parameters are passed 346 to Power Module-N 345, with populated data structures returned 347 to SOCCOMP 310.

Thus, the user may model accurate TAP characteristics during the architectural exploration phase of a System on a Chip. The user reviews the aggregated results for TAP characteristic generated by the modules before any detailed implementation of a final component level logic circuit is performed.

In an embodiment, the SOCCOMP compiler 310 also contains a module to perform the post logic synthesis estimates of the electronic system design. These estimates may also merely enable accurate TAP predictions and synthesis script generation. These estimates may also enable a transformation of a circuit description from a higher abstraction layer to a gate level logical implementation layer such as a Netlist.

In an embodiment, the SOC Compiler has instances of a timing module and an area/power module. Area and power may be represented using one model because there is a lot of commonality between the two. The timing module creates timing entries (=timing arcs) representing all of the critical paths in the sub component. The Area/Power module creates entries representing blocks of logic in the sub component. These are entered into the datamodel using standard function calls.

The TAP infrastructure tools of the SOC compiler 310 combine the entries from the models with technology information (and also user inputs in the case of power) to calculate the power, timing and area of the current user design.

Figure 3B:
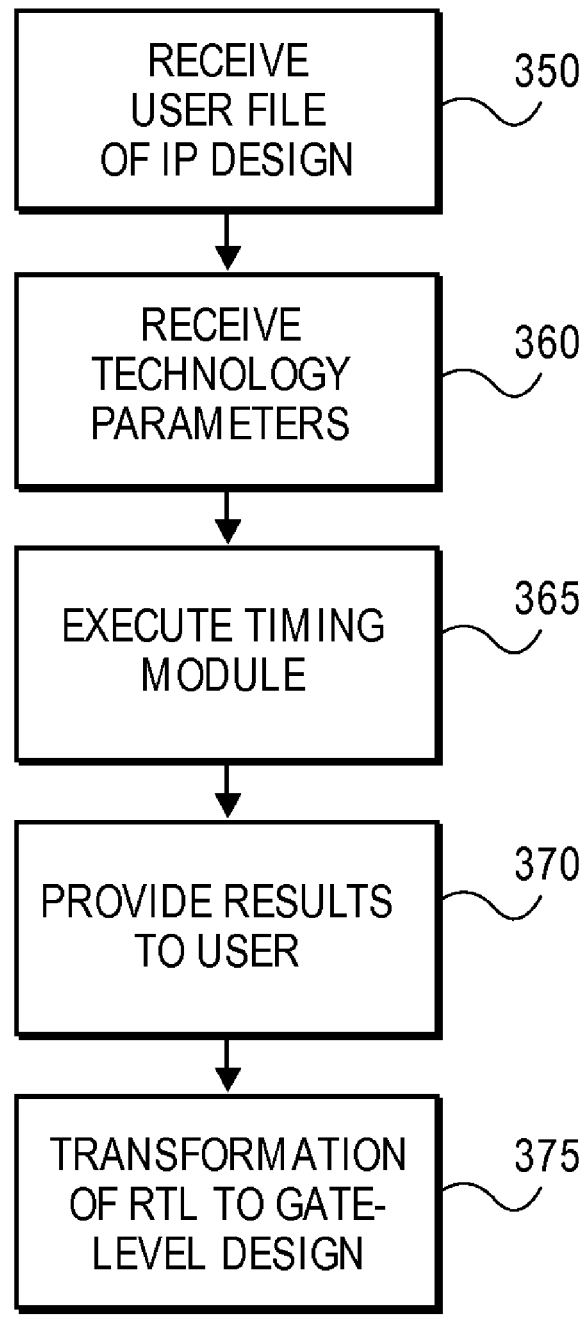
FIG. 3B illustrates an embodiment of a method for estimating timing constraints in an electronic design system.

FIG. 3B illustrates an embodiment of a method for estimating timing characteristics in an electronic design system. First, a user-supplied text file having data describing a configuration of an IP design is received 350. In one embodiment, the data may include one or more configuration parameters. Further, user-supplied silicon process technology parameters and potentially data-flow information are received 360.

In another embodiment, a timing module executes an abstract executable representation of timing characteristics for each hierarchical level of the IP design 365. For each level of hierarchy, the timing model predicts timing paths of the final logic circuit to be later implemented in a gate level design. The results of the timing model are provided to the user 370 prior to the transformation of the register transfer level design into a Netlist containing a gate-level circuit design. After the results of the timing model are provided to the user 370, the transformation of the register transfer level design into this logical implementation of the gate-level circuit design occurs in the design process 375. As stated above, a module external to the IP generator itself may accomplish the transformation of the RTL design into a gate-level circuit design.

It is possible for a design to comprise multiple levels of hierarchy. In such a case, the abstract executable representations of TAP characteristics may be executed hierarchically. A multi-level hierarchy is made up of multiple sub components. Each sub component can exist within other sub components. As an example, sub component A may contain an instance of sub component B. Area and power models may be calculated for all parts of sub component A that exist within that level of hierarchy. Sub component B may be at one level lower in the hierarchy than A. The area and power models may be calculated for each instance of sub component B. In another embodiment, sub component B may also contain additional sub components. In this example, each sub component has its area and power models sequentially calculated until all levels of the hierarchy are done. The execution may follow what is known in software as a "depth first traversal" of a tree graph. The execution follows going down the hierarchy before the analysis tool calculates models going across the hierarchy. Once all the models from each level of hierarchy have been calculated, the totals are summarized. These totals may be reported as a single total, or may be broken into sub-totals for each level in the hierarchy.

As discussed, the IP Generator 310 with its associated TAP modules 320-345 may perform timing, area, and power estimations at the IP sub-component level. Models are constructed that estimate the timing, area, and power characteristics of the sub-component without need for any representation of the internal component level structure of the IP sub-component.

Thus, the IP Generator 310 need not focus on representing the sub-component at the detailed transistor or logic gate level, and need not focus on analyzing the IP sub component at this level of abstraction. The sub-component estimates produced by IP Generator 310 are therefore created at a higher level of abstraction. This has the advantage that the estimates can be created without needing the actual implementation of the sub-component abstract executable representation, and the resulting estimator can operate more quickly because it is processing many fewer components to arrive at its answers. The resulting estimates of the IP Generator 310 may be less accurate than a gate level detailed estimate determined by processing the actual abstract executable representation that analyzes each timing path through each gate and transistor in that IP sub component.

For example, the timing modeling may consist of the following steps. For each timing path in an IP sub component, the timing module obtains the configuration parameters needed to calculate that path. The timing module then works out the length of the path in terms of levels of logic such as actual numbers of levels between the start and the end of the timing path plus the number branches and threads that need to be traversed by tracing the start to the end of the timing path. The timing module then calls a function to enter the path into the data model. The timing module may report merely the longest path in terms of time from the start to the end of the timing path or all possible paths in terms of time.

Similarly, the power calculation may be based on a combination of user activity scenarios and unit floorplan locations (or their defaults).

Figure 3C:
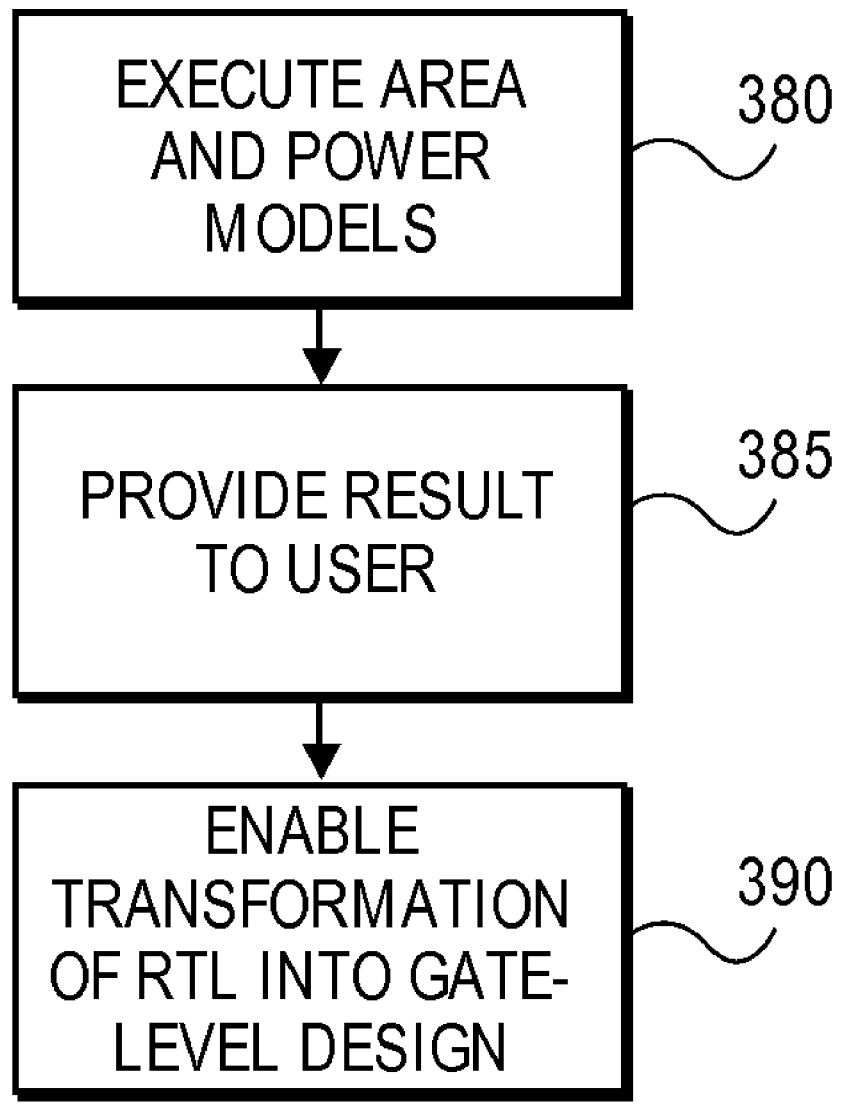
FIG. 3C illustrates an embodiment of a method of estimating area and power constraints for each hierarchical level within an IP design.

FIG. 3C illustrates an embodiment of a method of estimating area and power characteristics for each hierarchical level within an IP design. First, area and power models are executed for each hierarchical level in the IP design 380. These models predict area estimates and power consumption of a final logic circuit on a per level basis as well as a total of all levels of the circuit. Next, the user is provided a result of the area and power models 385. In one embodiment, these results are provided prior to enabling the transformation of the register-level design into a gate-level design. Lastly, transformation of the register transfer level design into the logical implementation of the gate-level circuit design is enabled 390. As stated above, this transformation may occur from an external module after the area and power models have been executed. In another embodiment, there may be execution a number of subsequent timing, area, and power models for each hierarchical level in the IP design based on a new set of revised parameters from the user prior to the transformation of the register transfer level design into the gate-level circuit design. Such execution may occur if the first results provided to the user were unacceptable, prompting changes to be made to the initial design.

Figure 4:
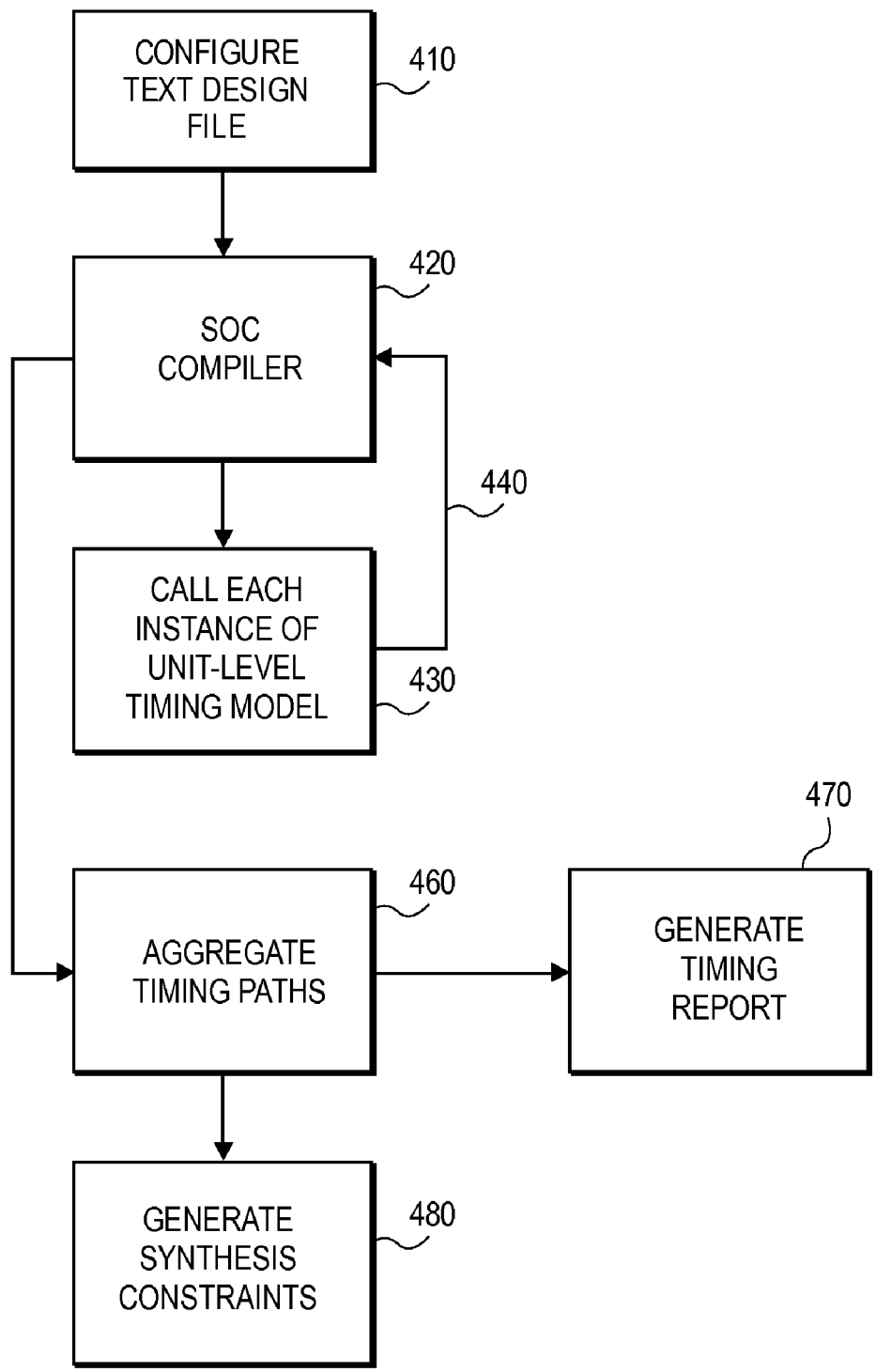
FIG. 4 illustrates an embodiment of a flow design of a timing module used as part of an SOC Compiler.

FIG. 4 illustrates an embodiment of a flow design of a timing module used as part of an SOC Compiler. The timing module is used to generate synthesis constraints and to report to the user the achievable clock frequency of their eventual RTL design. First, the configuration of the text design file of the IP blocks 410 is passed to the SOC Compiler (SOC-COMP) 420. Once received, SOCCOMP 420 determines how many instances of the timing module will be required based on the number of sub components in the IP blocks design. Next, SOCCOMP 420 calls each instance of the unit-level timing modules 430. SOCCOMP 420 sends empty data structures to each timing module instance along with user and internally derived parameters. Upon receipt of the data structures and parameters from SOCCOMP 420, each timing module populates the data structures and returns them 440 to SOCCOMP 420. Once all the populated data structures are received, SOCCOMP 420 aggregates all the timing paths for each sub component in the IP blocks design 460. This information will give a total timing path for all sub components in the design. Next, the timing data is reported 470 to the user as the achievable clock frequency of their the IP blocks design. Lastly, SOCCOMP 420 uses the aggregated timing values to generate synthesis constraints 480 of the IP blocks design, which will be used during the logic synthesis that subsequently occurs.

Figure 5:
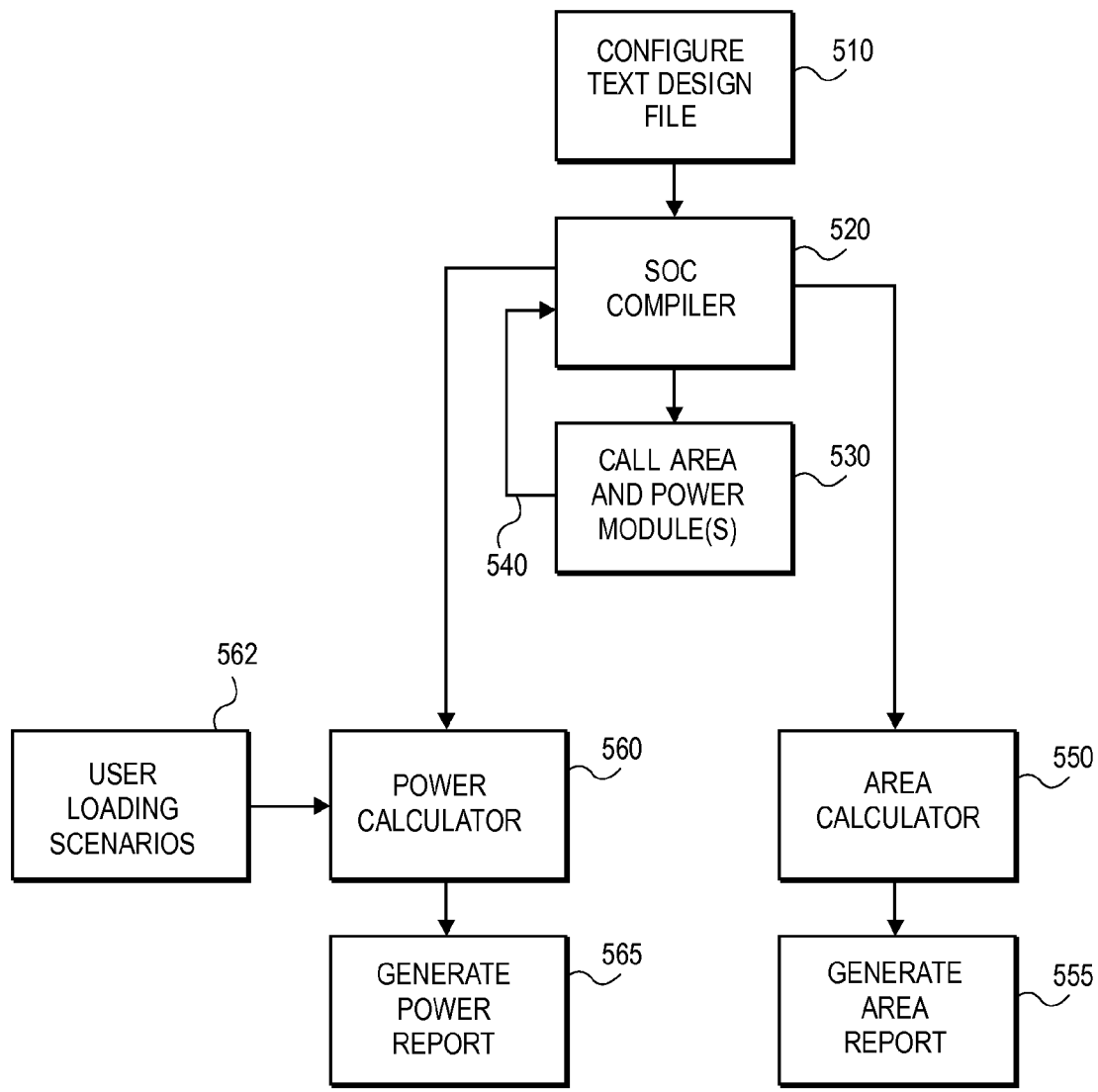
FIG. 5 illustrates an embodiment of a flow design of an area and power module used as part of an SOC Compiler.

FIG. 5 illustrates an embodiment of a flow design of an area and power module used as part of an SOC Compiler. The area and power modules are used to report to the user the estimated total power consumption and area requirements of the IP core design. First, the configuration of the IP blocks design 510 is passed to the SOC Compiler (SOCCOMP) 520. Once received, SOCCOMP 520 determines how many instances of power and area modules will be required based on the number of sub components in the IP blocks design. Next, SOCCOMP 520 sends empty data structures to each power and area module along with user and internally derived parameters. Upon receipt of the data structures and parameters from SOCCOMP 520, each power and area module populates the data structures and returns 540 the modules to SOCCOMP 520. Once all the populated data structures are received, SOCCOMP 520 receives user-loading scenarios (data flows) 562 and calculates the total power consumed by the IP blocks design 560. Next, SOCCOMP 520 generates power reports 565 which are given to the user. Lastly, SOCCOMP 520 calculates the total area required by the IP blocks design 550 and generates area reports 555 which are given to the user.

Figure 6:
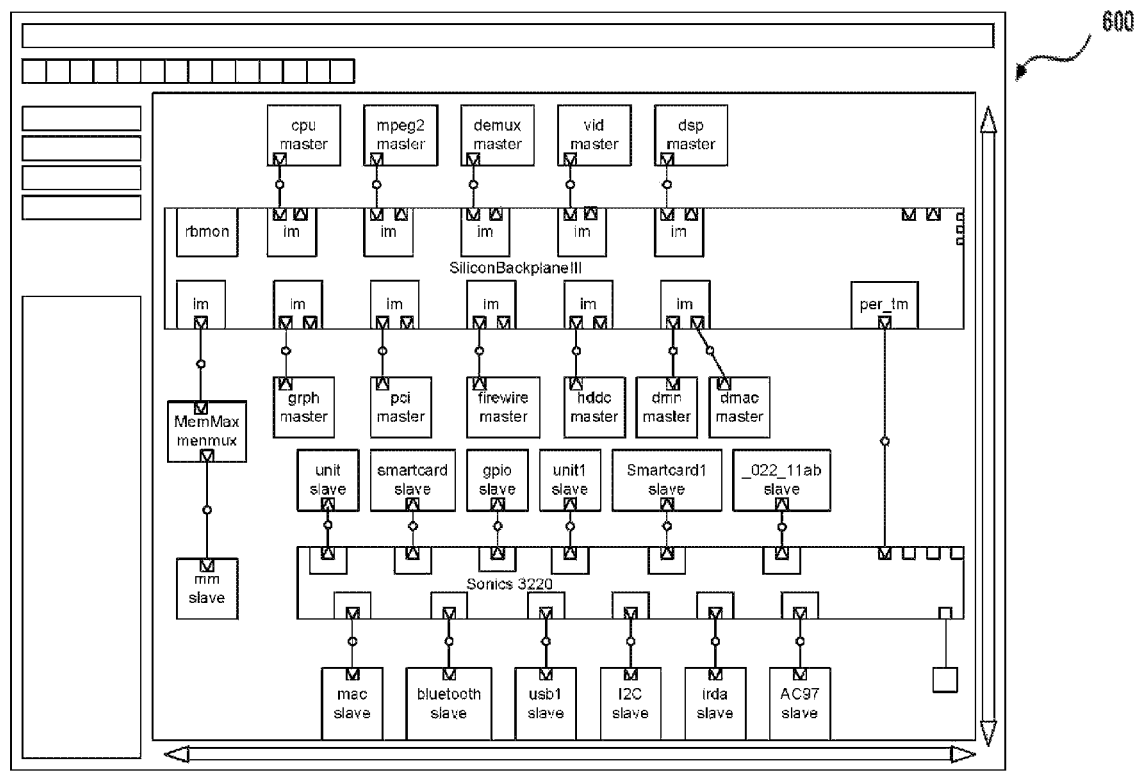
FIG. 6 illustrates a graphical user interface (GUI) view of an embodiment of the integration of a set top box SOC design.

FIG. 6 illustrates a graphical user interface (GUI) view of an embodiment of the integration of a set top box SOC design. The example set top box SOC design 600 has multiple IP blocks with two interconnect IP blocks all in a single System on a Chip. The groups of interconnect components from the two separate IP block representations of interconnects are combined during the front-end view design process by using the same design hierarchy description during the front-end view design process and the back-end file design process. Each interconnect IP block may be composed of multiple levels of IP sub component blocks. Similarly, the CPU core block, MemMax dynamic memory controller block as well as most of the various IP blocks making up this SOC are composed of multiple levels of IP sub component blocks. Each IP sub component block may be further decomposed down to the individual transistors and logic gates making up that IP sub component block.

The example System on a Chip may have multiple IP blocks such as a CPU core, a MPEG encoder/decoder core, a memory core, a Digital Signal Processor core, a Universal Service Bus core, a blue tooth core, a first interconnect IP core facilitating communications between a first set of IP blocks, and a second interconnect IP core facilitating communications between a second set of IP blocks as well as communications between the two IP interconnect blocks.

In one embodiment, the software used to facilitate aspects of SOC design process can be embodied onto a machine-readable medium. A machine-readable medium includes any mechanism that provides (e.g., stores) information in a form readable by a machine (e.g., a computer). For example, a machine-readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or methods stored on the machine-readable medium may be used in the process of creating the apparatuses and/or methods described herein. For example, the information representing the apparatuses and/or methods may be contained in an Instance, soft instructions in an IP generator, or similar machine-readable medium storing this information.

The IP generator may be used for making highly configurable, scalable System On a Chip inter-block communication systems that integrally manages data, control, debug and test flows, as well as other applications. In an embodiment, an example intellectual property generator may comprise the following: a graphic user interface; a common set of processing elements; and a library of files containing design elements such as circuits, control logic, and cell arrays that define the IP generator. In an embodiment, a designer chooses the specifics of the interconnect configuration to produce a set of files defining the requested interconnect instance. An interconnect instance may include front-end views and back-end files. The front-end views support documentation, simulation, debugging, and testing. The back-end files, such as a layout, physical LEF, etc are for layout and fabrication.

What is claimed is:

1. A method for estimating characteristics of an electronic design system, comprising:

creating a populated initial model for two or more intellectual property (IP) sub components in an IP design based on a user-supplied file having data describing a configuration of the IP design as well as user-supplied technology parameters that describe parameters of a cell based implementation technology, wherein a first IP sub component is composed of a heterogeneous mixture of processing logic, storage logic, or communications logic and is represented at least one layer of abstraction higher than a predicted Register Transfer Level (RTL) design making up the first IP sub component block;

aggregating an area estimate from each IP sub-component to generate an aggregate area consumption estimate of the IP design prior to performing logic synthesis of the electronic system design; and providing the aggregate area estimate of all the IP sub components to the user via a graphic user interface prior to a RTL design file of the IP design being transformed into the gate-level circuit design.

2. The method of claim 1, further comprising:

after providing the aggregate area estimate of all the IP sub components to the user via the graphic user interface, then receiving a revised user-supplied file with new data describing the configuration of the IP design composed of the two or more IP sub components to create a populated revised model for each of the two or more IP sub components in the IP design;

providing the aggregate area estimate of all the IP sub components in the populated revised model to the user via the graphic user interface, wherein the revised user-supplied file having data describing the configuration of the IP design solicited by the user interface is directly or indirectly correlatable to an amount and type of circuit level components that make up each IP sub component; and providing a power estimate of all the IP sub components in the populated revised model to the user via the graphic user interface, wherein the revised user-supplied file having data describing the configuration of the IP design solicited by the user interface is directly or indirectly correlatable to the amount and type of circuit level components that make up each IP sub component as well as activity information for the IP design and the power module generates parameters that estimate an amount of power consumed by the circuit level components that make up each IP sub component based on the user supplied technology parameters and the revised user supplied file.

3. A method for estimating characteristics of an electronic design system, comprising:

receiving a user-supplied file having data describing a configuration of an intellectual property (IP) design composed of two or more IP sub components, the data to include one or more configuration parameters;

receiving user-supplied technology parameters that describe parameters of a cell based implementation technology;

creating a populated initial model for each of the two or more IP sub components in the design, wherein a first IP sub component is composed of a heterogeneous mixture of processing logic, storage logic, or communications logic and is represented at least one layer of abstraction higher than a predicted register transfer level (RTL) design making up the first IP sub component block;

executing a power module based on the configuration of the IP design and the technology parameters, wherein the power module aggregates power consumption estimates of all of the IP sub components in the IP design prior to performing logic synthesis of the electronic system design;

providing the aggregate power consumption estimate of all the IP sub components to the user via a graphic user interface prior to a register transfer level design file of the IP design being transformed into the gate-level circuit design; and at least one of 1) supplying the RTL design of the electronic system design via an output module for logic synthesis, and 2), after providing the aggregate power consumption estimate of all the IP sub components to the user via the graphic user interface, then receiving a revised user-supplied file with new data describing the configuration of the IP design composed of the two or more IP sub components to create a populated revised model for each of the two or more IP sub component in the IP design.

4. The method of claim 3, wherein the user interface solicits information directly or indirectly correlatable to an amount and type of circuit level components that make up each IP sub component and the power module generates parameters that estimate an amount of power consumed by the circuit level components that make up each IP sub component based on 1) the user supplied technology parameters and 2) the user supplied file or the revised user supplied file when created having the data describing the configuration of the intellectual property (IP) design, wherein the user-supplied file having data describing a configuration of the intellectual property (IP) design includes information on a data flow activity scenario, and the IP design is an interconnect for an integrated circuit.

5. The method of claim 3, wherein the user-supplied file having data describing the configuration of the IP design solicited by the user interface is directly or indirectly correlatable to both 1) an amount and type of circuit level components that make up each IP sub component as well as 2) activity scenarios for the IP design to determine power consumption quantities and then the power module correlates the activity scenarios for the estimated amount and types of components that make up each IP sub component to predict power consumption characteristics for that IP sub component.

6. The method of claim 3, further comprising:

executing abstract executable representations of area characteristics for each IP sub component in the IP design, wherein an area module is configured to predict area measurements of a synthesizable RTL design of the IP design based on execution of the abstract executable representations of area characteristics; and presenting both the predicted area measurements and the predicted power consumption measurements to the user prior to transforming the register transfer level design into the gate-level circuit design.

7. The method of claim 3, further comprising:

executing a timing module for each IP sub component based on the revised parameters from the user prior to transformation of the register transfer level design into the gate-level circuit design.

8. The method of claim 3, wherein abstract executable representations of area and power characteristics for each IP sub component are explicitly coded and they model exclusively characteristics in the area and power domains, respectively, and wherein the user-supplied technology parameters that describe parameters of the cell based implementation technology at least include parameters of a silicon process technology, and one or more logic cell libraries to be used for implementation.

9. The method of claim 6, wherein the predicted area measurements and power consumption measurements are independent of using a design of an actual circuit called from a cell library, and where the user-supplied file having data describing the configuration of the IP design is gathered through filling out of a set of pre-defined parameters.

10. An apparatus generated by operations for estimating characteristics of an electronic design system, comprising:

receiving a user-supplied file having data describing a configuration of an intellectual property (IP) design composed of two or more IP sub components, the data to include one or more configuration parameters;

receiving user-supplied technology parameters that describe parameters of a cell based implementation technology;

creating a populated initial model for each of the two or more IP sub components in the design, wherein a first IP sub component is composed of a heterogeneous mixture of processing logic, storage logic, or communications logic and is represented at least one layer of abstraction higher than a predicted register transfer level (RTL) design making up the first IP sub component block;

executing a power module based on the configuration of the IP design and the technology parameters, wherein the power module aggregates power consumption estimates of all of the IP sub components in the IP design prior to performing logic synthesis of the electronic system design;

providing the aggregate power consumption estimate of all the IP sub components to the user via a graphic user interface prior to a register transfer level design file of the IP design being transformed into the gate-level circuit design; and at least one of 1) supplying the RTL design of the electronic system design via an output module for logic synthesis, and 2), after providing the aggregate power consumption estimate of all the IP sub components to the user via the graphic user interface, then receiving a revised user-supplied file with new data describing the configuration of the IP design composed of the two or more IP sub components to create a populated revised model for each of the two or more IP sub component in the IP design.

11. A non-transitory machine readable storage medium that contains data and instructions, which when executed by the machine, causes the machine to perform operations for estimating characteristics of an electronic design system, comprising:

receiving a user-supplied file having data describing a configuration of an intellectual property (IP) design composed of two or more IP sub components, the data to include one or more configuration parameters;

receiving user-supplied technology parameters that describe parameters of a cell based implementation technology;

creating a populated initial model for each of the two or more IP sub components in the design, wherein a first IP sub component is composed of a heterogeneous mixture of processing logic, storage logic, or communications logic and is represented at least one layer of abstraction higher than a predicted register transfer level (RTL) design making up the first IP sub component block;

executing a power module based on the configuration of the IP design and the technology parameters, wherein the power module aggregates power consumption estimates of all of the IP sub components in the IP design prior to performing logic synthesis of the electronic system design;

providing the aggregate power consumption estimate of all the IP sub components to the user via a graphic user interface prior to a register transfer level design file of the IP design being transformed into the gate-level circuit design; and at least one of 1) supplying the RTL design of the electronic system design via an output module for logic synthesis, and 2), after providing the aggregate power consumption estimate of all the IP sub components to the user via the graphic user interface, then receiving a revised user-supplied file with new data describing the configuration of the IP design composed of the two or more IP sub components to create a populated revised model for each of the two or more IP sub component in the IP design.

12. The non-transitory machine readable storage medium of claim 11, wherein executing the power module includes generating parameters that estimate an amount and type of circuit level components that make up each IP sub component based on the user supplied configuration parameters, and translating the estimated amount and type of circuit level components that make up each IP sub component to a power consumption quantity by applying the user-supplied technology parameters.

13. The non-transitory machine readable storage medium of claim 11, wherein a first abstract executable representation of power consumption characteristics for a first IP sub component is explicitly coded to translate parameters of the first IP sub component into a power consumption quantity and the power module models power exclusively with characteristics in the power consumption domain.

14. A non-transitory machine readable storage medium that contains instructions, which when executed by the machine, cause the machine to perform the following operations, comprising:

receiving a user-supplied file having data describing a configuration of an intellectual property (IP) block design of an integrated circuit having multiple levels of hierarchy, the data to include one or more configuration parameters;

receiving user-supplied implementation technology parameters, where the user-supplied file having data describing the configuration of the IP block design is not a Register Transfer Level (RTL) file;

creating an abstract executable representation of power consumption characteristics for each IP sub component making up the IP block design with an explicitly coded power module;

estimating internal activity scenarios for the IP block design with the explicitly coded power module;

generating parameters that estimate an amount and type of circuit level components that make up each IP sub component based on the user supplied configuration parameters with the explicitly coded power module;

translating the estimated internal activity and estimated amount and type of circuit level components that make up each IP sub component with the explicitly coded power module to predict a power consumption quantity for that IP sub-component by applying the user-supplied implementation technology parameters;

aggregating each IP sub-component power consumption estimate with the explicitly coded power module to generate an aggregate power consumption estimate for the IP block design prior to the RTL file being generated;

presenting the aggregated power consumption estimate to the user via a graphic user interface prior to logic synthesis of a RTL design of the IP block design; and using the aggregated power consumption estimate in creating the RTL design of the electronic system design, which is supplied for logic synthesis.

15. The non-transitory machine readable storage medium that contains the instructions of claim 14, wherein the IP design is an interconnect for the integrated circuit, and the integrated circuit is a System-on-a-Chip.

16. The non-transitory machine readable storage medium that contains instructions of claim 14, which when executed by the machine, causes the machine to perform the following operations, further comprising:

estimating a time frame for a signal transition to travel through each IP sub-component in the electronic design system prior to performing logic synthesis of the electronic system design and then aggregating each IP sub-component time estimate to generate an overall timing estimate of the IP design; and generating synthesis scripts to establish timing goals for the IP block design with the time estimates.

17. A method for estimating characteristics of an interconnect for a System-on-a-Chip, comprising:

creating a populated initial model for two or more intellectual property (IP) sub components in an IP design of the interconnect based on a user-supplied file having data describing a configuration of the IP design as well as user-supplied technology parameters that describe parameters of a cell based implementation technology, wherein a first IP sub component is composed of a heterogeneous mixture of processing logic, storage logic, or communications logic and is represented at least one layer of abstraction higher than a predicted Register Transfer Level (RTL) design making up the first IP sub component block;

aggregating an power estimate from each IP sub-component to generate an aggregate power consumption estimate of the IP design prior to performing logic synthesis of the electronic system design by translating estimated internal activity and an estimated amount and type of circuit level components that make up each IP sub component to predict a power consumption quantity for that IP sub-component by applying both the user-supplied implementation technology parameters and the user-supplied configuration of the IP design;

providing the aggregate power estimate of all the IP sub components to the user via a graphic user interface prior to a Netlist of the IP design being transformed into a gate-level circuit design;

after providing the aggregate power estimate of all the IP sub components to the user via the graphic user interface, then receiving a revised user-supplied file with at least new user-supplied implementation technology parameters of the IP design composed of the two or more IP sub components to create a populated revised model for each of the two or more IP sub components in the IP design; and providing a revised aggregate power estimate of all the IP sub components in the populated revised model to the user via the graphic user interface, all prior to a register transfer level design file of the IP design being transformed into the gate-level circuit design, wherein the IP design of the interconnect has multiple levels of hierarchy.

18. A non-transitory machine readable storage medium that contains data and instructions, which when executed by the machine, causes the machine to perform operations for estimating characteristics of an interconnect for a System-on-a-Chip, comprising:

creating a populated initial model for two or more intellectual property (IP) sub components in an IP design of the interconnect based on a user-supplied file having data describing a configuration of the IP design as well as user-supplied technology parameters that describe parameters of a cell based implementation technology, wherein a first IP sub component is composed of a heterogeneous mixture of processing logic, storage logic, or communications logic and is represented at least one layer of abstraction higher than a predicted Register Transfer Level (RTL) design making up the first IP sub component block;

aggregating an power estimate from each IP sub-component to generate an aggregate power consumption estimate of the IP design prior to performing logic synthesis of the electronic system design by translating estimated internal activity and an estimated amount and type of circuit level components that make up each IP sub component to predict a power consumption quantity for that IP sub-component by applying both the user-supplied implementation technology parameters and the user-supplied configuration of the IP design;

providing the aggregate power estimate of all the IP sub components to the user via a graphic user interface prior to a Netlist of the IP design being transformed into a gate-level circuit design;

after providing the aggregate power estimate of all the IP sub components to the user via the graphic user interface, then receiving a revised user-supplied file with at least new user-supplied implementation technology parameters of the IP design composed of the two or more IP sub components to create a populated revised model for each of the two or more IP sub components in the IP design; and providing a revised aggregate power estimate of all the IP sub components in the populated revised model to the user via the graphic user interface, all prior to a register transfer level design file of the IP design being transformed into the gate-level circuit design, wherein the IP design of the interconnect has multiple levels of hierarchy.

\* \* \* \* \*